United States Patent [19]

Steinbock

[11] Patent Number: 4,846,614
[45] Date of Patent: Jul. 11, 1989

[54] DIFFERENTIAL THREAD FOR TRANSFER OF SCREW THREAD FORCES

[76] Inventor: Rolf Steinbock, 603 Lindsay Rd., Carnegie, Pa. 15106

[21] Appl. No.: 939,350

[22] Filed: Dec. 8, 1986

[51] Int. Cl.[4] .................. F16B 39/28; F16B 39/30
[52] U.S. Cl. ................................ 411/307; 411/263; 411/432; 411/436
[58] Field of Search ............... 411/185, 186, 288, 290, 411/291, 263, 307, 432, 938, 436

[56] References Cited

U.S. PATENT DOCUMENTS

| | | | |
|---|---|---|---|
| 1,369,156 | 2/1921 | Woodward | 411/307 |
| 1,922,689 | 8/1933 | Linnenbruegge | 411/427 |
| 2,870,668 | 1/1959 | Flahaut | 411/436 |
| 3,056,443 | 10/1962 | Knocke | 411/186 |
| 3,618,994 | 11/1971 | Gepfert | 411/432 |
| 4,266,590 | 5/1981 | McKewan | 411/307 |
| 4,622,730 | 11/1986 | Steinbock | 411/432 |

FOREIGN PATENT DOCUMENTS

288520 5/1953 Switzerland .................. 411/263

Primary Examiner—Neill R. Wilson
Attorney, Agent, or Firm—Clifford A. Poff

[57] ABSTRACT

A fastening apparatus is provided wherein the length of a mating threaded connection between two members is limited as a function of an effective differential pitch to the uniform pitch of the threads on both members whereby clearances of progressive increasing amounts are established between successive opposed tooth flanks. An elastic deformation of one member occurring in a direction opposite to the increasing of the amounts of clearance brings successive opposed flank portions into a force transmitting relationship whereby the total area of flank-to-flank contact between the threads varies as a function of the applied load.

20 Claims, 4 Drawing Sheets

DIFFERENTIAL THREAD FOR TRANSFER OF SCREW THREAD FORCES

BACKGROUND OF THE INVENTION

1. Field of the Invention

This invention relates to an apparatus to distribute stresses imposed on a threaded fastener apparatus over a length of mating threads to more effectively transfer an applied force which may cause elastic deformation of interfitting threads over the length of thread of two members which are in mutual engagement.

2. Description of the Prior Art

Conventional screw thread systems have been developed through the use of various screw thread forms most of which have isometrical sides inclined at equal angles with a vertical center line through the thread appex. Examples of present day thread forms include the Unified and the Whitworth V-thread forms. An example of earlier thread forms which are used occasionally is the Sharp V-thread form. Isometrical V-threads are relatively easy to manufacture and inspect; hence they are widely used on mass produced, general-purpose threaded fasteners of all types. In addition to general-purpose fastener application, certain threads are used to repeatedly move or translate machine parts against heavy loads. For these so-called translation threads a more efficient thread form is required. The most widely used thread forms for this purpose are the Square, the Acme and the Buttress. The Square thread is generally regarded as most efficient, but is difficult to cut because the thread form provides parallel sides. It also cannot be adjusted to compensate for wear. The Acme form of thread does not suffer from the disadvantages of the Square thread form; it is stronger and only slightly less efficient. The Bustress thread form is used for translation of loads in one direction only. Because of its non-symmetrical form, it combines the high efficiency of the Square thread with the high strength of the V-thread and with the ease of cutting and adjustment of the Acme thread. Translation thread forms are usually only loaded slightly and the application of a force is not sufficient to cause elastic deformation of one or more interfitting threads.

The applied load can be either a tension load or compressive load on the externally threaded member with respect to the internally threaded member.

To achieve a uniform loading of the externally threaded member over a given threaded length, it is necessary that the elastic deformation over that length be sufficient to create the desired stress between all of the mating threads. There are, however, many kinds of elastic deformations within the threaded connection whereby an exact analysis becomes very complex. For example, there may be slack in the joint of the workpiece being acted upon by the threaded fastener; slack between mating threads of the fastener; elastic deformation of the workpiece and/or fastener; surface roughness on the workpiece and/or fastener; a tolerance mismatch; and bending of threads. However, for practical purposes, one can make assumptions that will render practical results. A practical approach is to derive a measure of a unit strain which must be accommodated by the threads with the elastic limit of the material comprising the threads. A simple formula for unit strain defines that the strain is equal to the stress which must be accommodated by the thread system divided by the modules of elasticity. For example, if one desires to accommodate a stress of 90,000 pounds per square inch in a fastener having a modules of elasticity of 30,000,000 pounds per square inch, the unit strain is calculated to equal 0.003 inches per inch. This means that if the fastener is loaded over a length of one inch, the fastener will have to be stretched 0.003 inch within the one inch of thread length. If the fastener were loaded over a thread length of 10 inches, the fastener will be stretched by an amount equal to 0.030 inch along the thread length of 10 inches.

External and internal thread forms traditionally have the same thread pitch to transfer loads between the standard internal and external threads. Because of the elastic properties of the material comprising the thread, a concentration of high loads and stresses occur at the site where the applied force is initially transferred from one member to the other. Because of the relative rigidity of the thread materials, the initial convolutions of mating screw threads will transfer most of the forces resulting in a high concentration of stresses at this site. Elastic and plastic deformations of the first convolution of mating threads allow a certain amount of forces to be transferred by subsequently occurring thread convolutions. Thus, in actual practice, all of the forces are transferred by only a few of the mating thread convolutions.

The elastic deformation of the material forming the threads at the initial site for transfer of loads leads to static or fatigue failure of the materials, thus, also a failure of the screw thread system. This invention seeks to avoid this problem by utilizing a thread system in which internal and external threads forming a differential thread pitch are brought into mating engagement in a manner so that the tooth flanks of the elastically interfitting threads move through clearance distances in a progressively increasing manner in response to forces causing the tooth flanks to mate, depending upon the magnitude of the applied force and transmitted force. Moreover, it can be seen that the selection of the differential pitch can be made in relation to the member receiving the applied force so that the progressive establishment of a force transmission between the tooth flanks proceeds in the same direction as the applied force. It is necessary, however, according to the present invention that interference does not exist between the threads along the entire length of the interfitting threads. The present invention is particularly advantageous when utilized to mechanically stress a bolt-type fastener as disclosed in my U.S. Pat. No. 4,622,730.

As shown, for example, in U.S. Pat. No. 4,266,590 a uniform pitch of nut thread is a predetermined amount less than the uniform pitch of bolt thread so that within the threaded length of the nut there is flank-to-flank contact between threads at the top and at the bottom of the nut. The flank-to-flank contact between the screw threads at opposite ends of the nut must transmit at only one site all the forces which must be transferred between the nut and screw of the fastener. The mating screw threads between the opposite ends of the nut come into flank-to-flank engagement only after the mating thread flanks distort at one end of the fastener by an amount sufficient to alter the spacing between the subsequently occurring thread flanks. Another form of differential thread pitch for a fastener device can be found in a differential pitch to the threads on a fastener in which the pitch of the screw threads varies along the length of the threads. An example of such a threaded fastener is shown in U.S. Pat. Nos. 3,454,070; 3,799,299;

and 2,356,098. Lastly, U.S. Pat. No. 1,869,156 discloses the combination of a screw thread in one member having a uniform pitch and a screw thread in a second member having a different and variable pitch so that the threads will frictionally lock together the co-acting threaded members. In all these known fasteners, the threads of at least one member are jammed or upset by the threads of the other member in a manner which can be generally characterized by the fact that a tension or compression force on one of the members must always be taken by only a minor portion of the mating length of threads.

SUMMARY OF THE INVENTION

It is an object of the present invention to provide a fastening apparatus in which two members have threads of a uniform pitch in which the effective pitch is different and the length of mating threads is limited to prevent jamming between the threads and permit flanks of successively innerfitting threads to move together under a force producing elastic deformation of one or both of the members.

It is a further object of the present invention to provide an improved fastening apparatus in which the length of a mating threaded connection between two members is limited as a function of an effective differential pitch to the uniform pitch of the threads on both members whereby clearances of progressive increasing amounts are established between successive opposed tooth flanks so that an elastic deformation of one member occurring in a direction opposite to the increasing of the amounts of clearance brings successive opposed flank portions into a force transmitting relationship whereby the total area of flank-to-flank contact between the threads varies as a function of the applied load.

More particularly, according to the present invention, there is provided a threaded fastener apparatus including the combination of an internally threaded first member including internal threads having a first uniform pitch along a predetermined length thereof, and an externally threaded member including external threads along a predetermined length thereof for mating engagement with a predetermined length of the threads of the first member, the external threads having a second uniform pitch which is effectively different from the first uniform pitch of the internal threads by an amount such that the length of inter-fitting internal and external threads starts at a point of mating engagement where contact between an external thread flank and an internal thread flank exists and proceeding therefrom, the corresponding successively occurring opposed thread flanks are spaced apart by progressively increasing amounts of clearance without interference between the interfitting threads for establishing a force transmitting contact between the spaced apart flanks by elastic deformation of at least one of the first and second members, the elastic deformation occurring in response to a force applied in a direction generally parallel to the direction of the progressively increasing amount of clearance between thread flanks.

The elastic deformation of at least one of the first and second members which may be advantageously utilized in a part of a fastener apparatus where flank-to-flank contact between threads is accompanied by a radial deflection of the thread in a direction which reduces void areas at the crest and root of the threads.

These features and advantages of the present invention, as well as others, will be more fully understood when the following description is read in light of the accompanying drawings of which:

Figure 1:
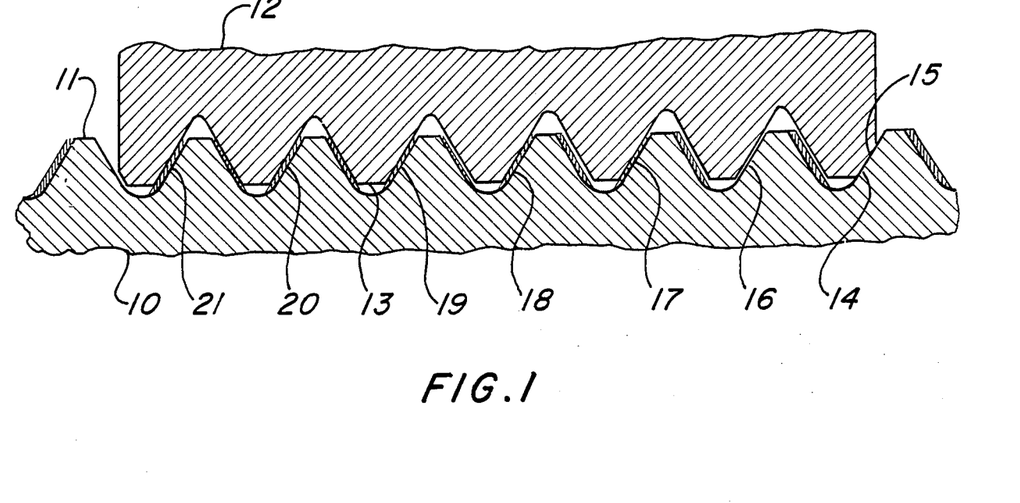
FIG. 1 is an enlarged fragmentary view of interfitting members embodying the features of the present invention.

Referring first to FIG. 1 there is illustrated an enlarged portion of a one-inch, eight threads per inch course thread series (UNC) thread which has been modified to incorporate the features of the present invention. One member is a screw 10 provided with external threads 11 and another member 12 is provided with internal threads 13. The threads 11 and 13 both have a uniform pitch but one thread pitch is different from the pitch of the other threads by a small amount whereby clearances are formed between thread flanks commencing after a site where a thread flank 14 is in a mating, force transmitting engagement with thread flank 15. Gaps or clearances of progressively increasing magnitudes occur at sites 16-21 because the pitch of one thread is slightly shorter than the pitch of the other thread. In FIG. 1, the pitch of thread 11 is slightly smaller than the pitch of thread 13. This relationship between the pitch of the threads is useful for a fastening apparatus subject to tension loads. For compressive loads, the pitch of the thread 11 will be greater than the pitch of the thread 13. It can be assumed that the fastener apparatus, when constructed of steel, may comprise a modulus of elasticity of 30 million pounds per square inch. Thread 11 is one inch in diameter, 7.936 threads per inch. Thread 13 comprises one inch diameter 8.000 threads per inch, course thread series, whereby the differential between threads 11 and 13 is 0.008 inch per inch, i.e., 8.000/7.936−=0.008. Given that the unistrain is equal to the strain multiplied by the modulus of elasticity there will be produced a loading of 192 thousand pounds per square inch, assuming that the internal threads are rigid and 0.8 inches long. $0.008 \times 300,000,000 = 192,000$ psi) In practice, the calculated unit stress should be adjusted to compensate for the elastic properties of the internally threaded member. Depending on the design of the internally threaded member, the actual loading can be assumed to be about 140 thousand pounds per square inch. It is important to note that according to the present invention as the thread-loading proceeds from a 0 or a low value to a maximum value, the gaps 16-21 which progressively increase from a minimum at gap 16 to a maximum gap 21 will progressively diminish because of the differential to the thread pitch. As this occurs, the two thread flank surfaces move into a force transmitting mutual contact by a relatively small elastic deformation at the site of flanks 14 and 15. As an initial and relatively small elastic deformation occurs between tooth flanks 14 and 15, there is established metal-to-metal contact eliminating gap 16. Continued application of deformation forces produces elastic deformation to flanks 14 and 15 and at the previous site of gap 16 whereby gap 17 is eliminated and the two flank surfaces move into metal to metal contact. Thus, as the elastic deformation forces proceed to a maximum, the tooth flanks previously separated by gaps move into metal-to-metal contact in a successive manner until all of the threads are in mutual mating engagement and take part in the transmission of forces between the threaded members.

Figure 2:
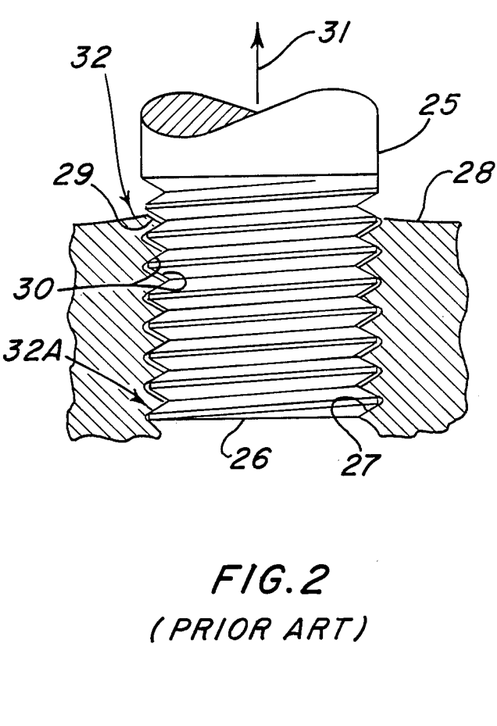
FIG. 2 is a sectional view illustrating the effect of large deformation forces on interfitting threads of two members which have the conventional same pitch.

In FIG. 2 there is illustrated a shaft 25, shown under load, having a threaded end portion 26 made up of external threads which were formed with a uniform pitch that is the same as the uniform pitch of internal threads 27 formed in member 28. In addition to the same pitch, the thread 26 and 27 have the same thread form and fall within the same standard thread series.

The tooth-flank surfaces 29 of threads 26 and tooth-flank surfaces 30 of threads 27 are in mutual opposed relation with only a small operating clearance between the threads as part of the standard for the particular thread. When a force is applied to shaft 25 in the direction of arrow 31 relative to member 28, the tooth-flank surfaces 29 and 30 are brought into force transmitting contact with one another. As the magnitude of the force in direction 31 increases, all the screw threads are subject to deformation. In the area of the first convolution of interfitting threads identified by reference numeral 32 there will occur a plastic deformation of the metal immediately adjacent the internal thread. The moving of thread crests on member 25 between thread crests on successively occurring threads in member 28 diminishes rapidly in a manner such that no stretching occurs at the last stretch site; identified by reference numeral 32 A. This is because the interfitting threads are not uniformly loaded under the applied force.

Figure 3:
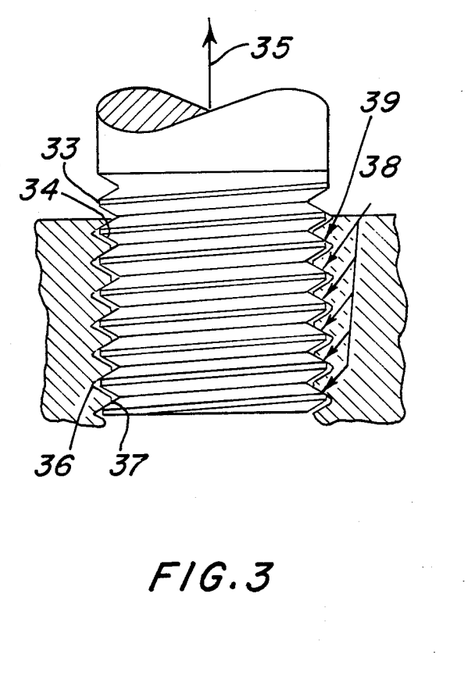
FIG. 3 is a view similar to FIG. 2 but illustrating the effect of the present invention on similar members when subject to a force causing elastic deformation.

In contrast to this, the present invention provides, as can be seen from FIG. 3, that the interfitting threads 33 and 34 also shown under load are arranged with a small thread pitch differential so that under the applied load in the direction of arrow 35, the inter-fitting thread convolutions 36 and 37 which are most remote to the applied force are brought into contact first. The force transmitting relation is supplemented by the next convolution of thread moving into a force translating relationship as the thread flanks contact one another under only a relatively modest increase to the applied force. The affect cascades along sites 38 towards the site 39 of the last complete interlocking thread convolution whereby the applied force is distributed for transmission along the entire length of the interfitting threads between the two members.

Figures 4, 5:
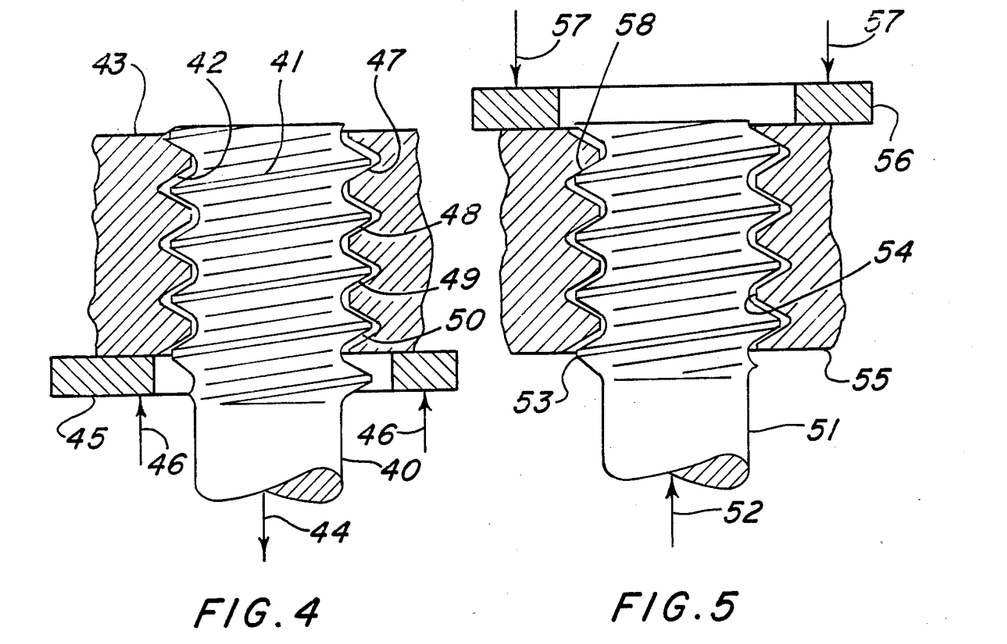
FIGS. 4 and 5 are fragmentary views in section illustrating the effect of tension-load and compression-load respectively on thread apparatus embodying the present invention.

In FIG. 4 there is illustrated a threaded fastening apparatus in which a shaft 40 has threads 41 extending along an end portion thereof. The length of the threads 41 is slightly shorter than the length of internal threads 42 formed in a nut or anchor member 43. In this arrangement of apparatus, the member 40 is subject to a tension load in a direction indicated by arrow 44. The forces developed in response to this tension load are transferred by the member 43 to a foundation 45 or some other member in a direction which is indicated by arrows 46. As the tension load is applied to member 40, the thread convolutions move so that the tooth-flanks of the first interfitting convolution 47 make contact and transfer the forces at that site. As the tension load increases, tooth flanks of successive interfitting thread convolutions 48, 49 and 50 are pulled into contact with one another in response to the elastic deformation of the thread portion 41. As will be understood by those skilled in the art the differential between the pitch of threads 41 and pitch of threads 42 is sufficiently small so that flanks of the threads can move into a force transmitting relation whereby clearances shown in FIG. 4 at thread convolutions 47-50 are eliminated. As will also be understood to those skilled in the art, the length of interfitting threads in relation to the material which undergoes elastic deformation as well as the differential thread pitch are parameters which must be selected so that elastic deformation of one threaded member relatively to the other permits the thread flanks of interfitting threads to move in contact with one another. Interference between the threads along the length of the threaded interconnection, must be avoided so that the area of first contact between flanks of the first thread convolution proceeds with a small, but ever increasing clearance between successively occurring thread flanks.

In FIG. 5 there is illustrated a shaft member 51 that is subject to a compressive load in a direction of arrow 52 which brings about a transfer of forces between a threaded end portion comprised of external threads 53 and a threaded internal portion comprised of internal threads 54 in a support member 55. A resistance to the compressive force applied in direction 52 is supplied by a support member or foundation anchor 56 in a direction generally indicated by arrows identified by reference numeral 57. The application of the compressive force in direction 52 moves the tooth flanks of the first convolution of external threads 53 into metal-to-metal contact with the tooth flanks of mating internal threads 54 in support member 55. This initial condition is identified by reference numeral 58. As the compressive force is increased, the tooth flanks of successive convolutions of threads on member 50 move into contact with thread convolutions of toothflanks of the internal threads 54 due to elastic deformation of the threaded end portion.

Figures 6, 7:
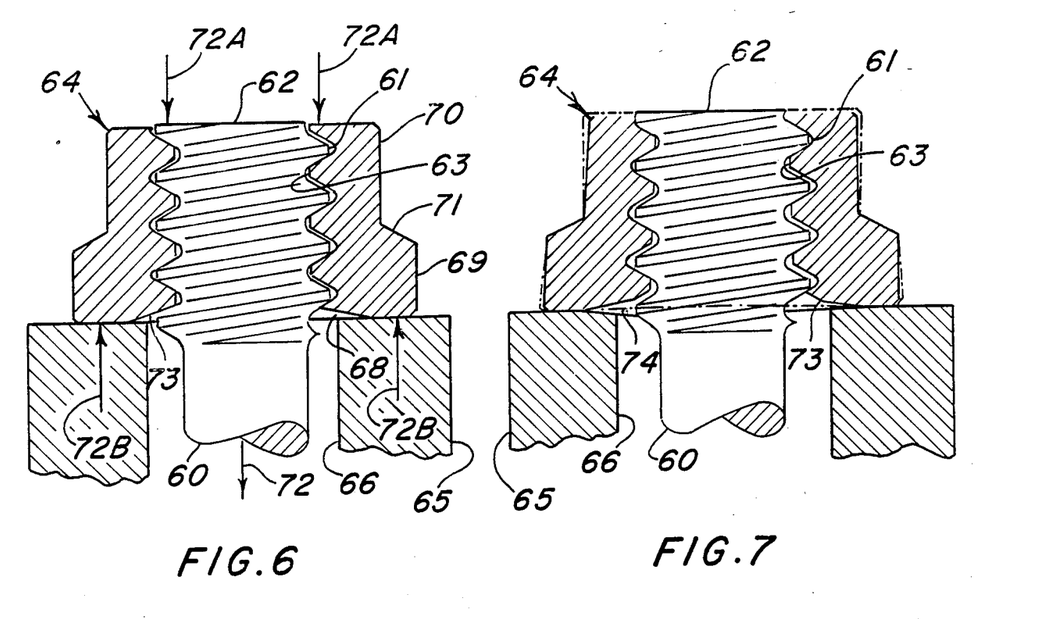
FIGS. 6 and 7 are fragmentary views in section of a fastener apparatus in which a nut member is constructed in a manner to undergo elastic deformation in a direction which is perpendicular to the direction of applied force.

A further aspect of the present invention provides for the construction of a fastener apparatus in which an internally threaded member, such as a nut member, embodies a design which causes the nut member to deflect when the mating threads transfer high loads to the nut member. The resulting elastic deformation of the nut member results in gradual uniform loading of the mating threads. Referring to FIG. 6 of the drawings, there is a shaft member 60 having external threads 61 on an end portion 62 of the shaft. The threads 61 have a uniform pitch which under a no load condition can be the same uniform thread pitch or a different uniform thread pitch of internal threads 63 formed in a nut member 64. When threads 61 and 63 have the same uniform pitch, nut member 64 will deflect under load as shown in FIG. 7 effectively creating a differential to the thread pitch between the two members. Thus, the force is gradually transferred between the two members. When threads 61 and 63 have a different uniform pitch, nut member 64 will also deflect under the load as shown in FIG. 7. The initial thread pitch difference is increased.

The nut member 64 engages a support member 65 which has an opening 66 of sufficient size so that the threaded end portion of the shaft member can pass freely through the opening. A flat load transfer face 67 is formed on one end of the nut member. The face extends to a relief area 68 that extends from face surface 67 to the internal threads 63. Exteriorly, the nut includes an enlarged flange bottom 69 and a top portion 70 of reduced transverse size. Between the bottom 69 and the top portion 70 there is a transition surface 71. When the shaft member is subject to a tension load applied in a direction indicated by arrow 72 the nut member is pulled against the support 65 under an equal and opposite resistant force. The flange bottom 69 is provided with an increased diameter to take up tensile stresses occurring in that part of the nut whereas the top portion 70 is provided with a reduced transverse size so that the threads immediately internally thereof can deflect but cannot move further then against the threads 63. The deflection of the top portion 70 is caused by the provision of the relief area 68. As can be seen in FIG. 7, the relief area 68 causes the reaction force 72B to move outward from the thread force 72A creating a fulcrum action about the radially spaced adjacent contacting surface of the nut member 65 and thus creating a bending movement in the nut member. The bending movement causes the nut member to to elastically deform in response to the bending moment which is created in the nut member. The elastic deformation in addition to producing an inward movement of the top portion also is accompanied by an outward deflection of the bottom portion which is indicated by the phantom line 74. Because the top portion of the nut moves inwardly and the bottom portion moves outwardly, the elastic deformation effectively creates a different thread pitch in the two member.

Figure 8:
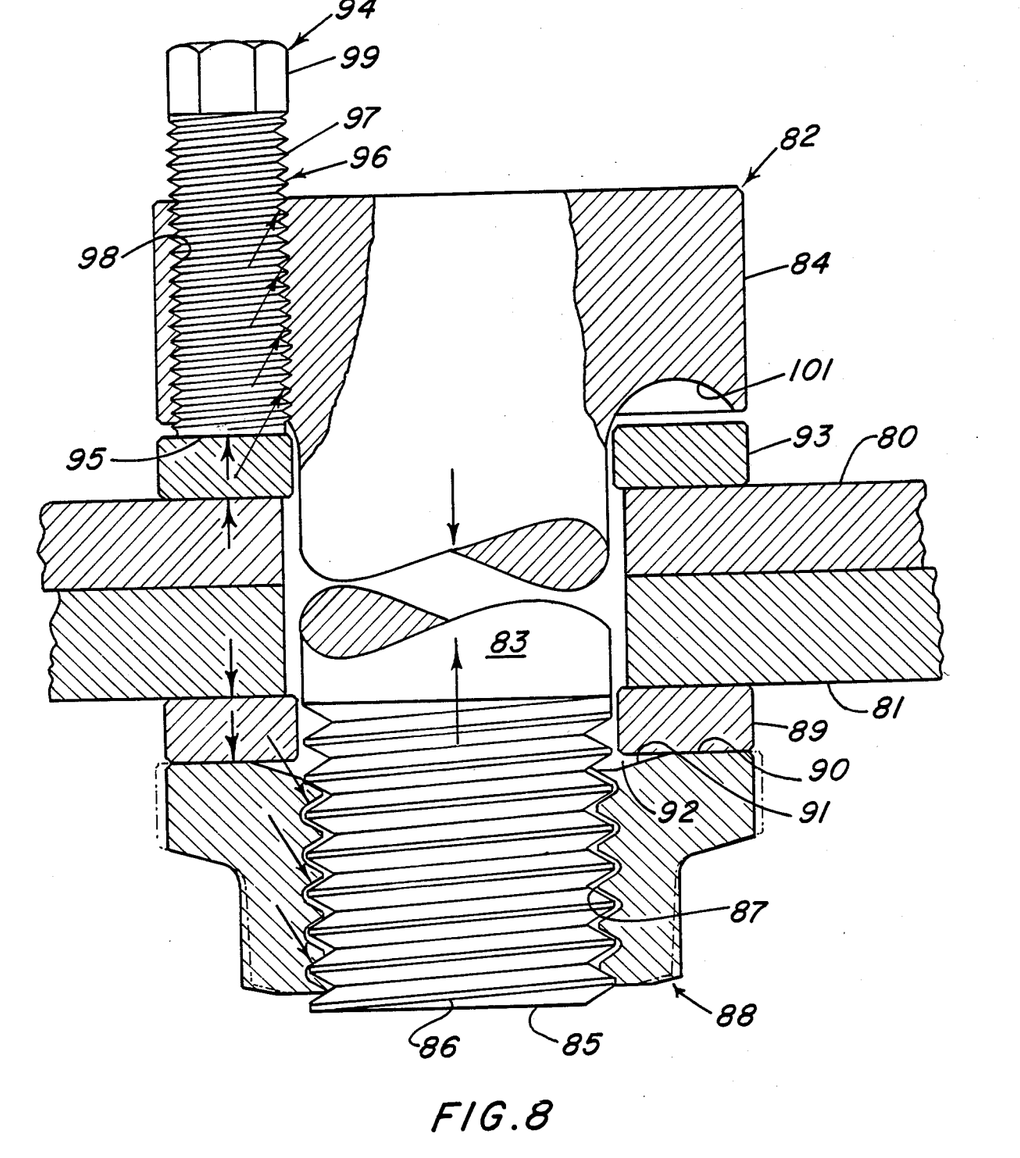
FIGS. 8 and 9 are an elevational view in section and a top view respectively of a further embodiment of the present invention.
Figure 9:
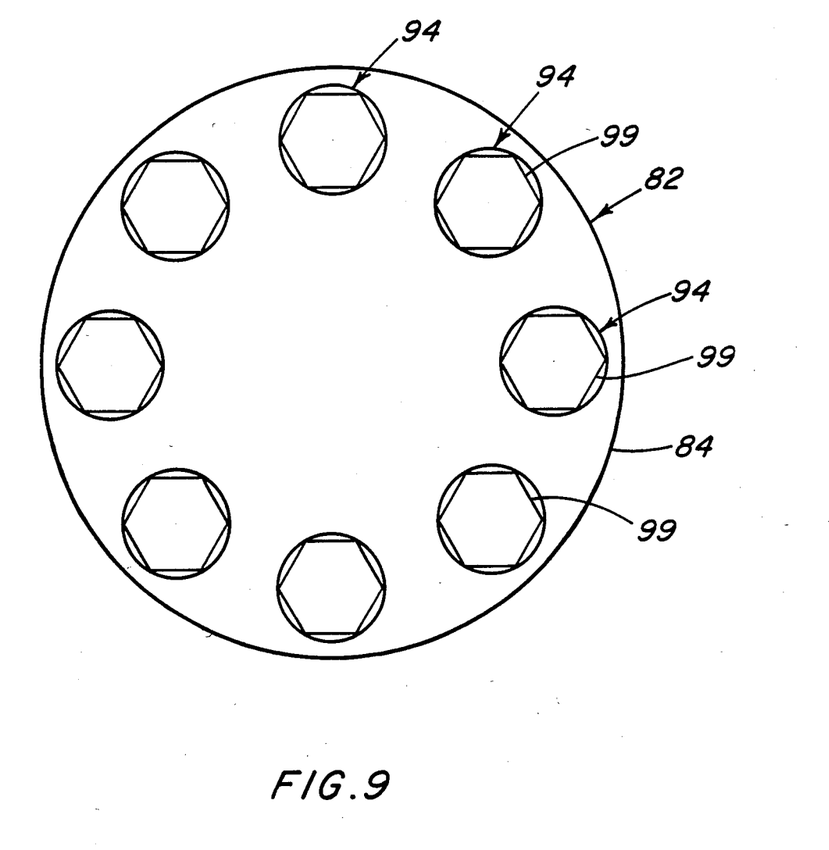

In FIGS. 8 and 9 there is illustrated a threaded fastener apparatus which embodies further features of the present invention for clamping together two members 80 and 81. The fastener apparatus which is identified by reference numeral 82 includes a shank portion 83 comprising part of a bolt member which further includes a head portion 84 and opposite thereto, a threaded end portion 85 comprised of threads 86. The threads 86 have a uniform pitch which can be the same but preferably is slightly less than the pitch of threads 87 formed internally in a nut member 88. The nut member 88 is constructed in the same manner as described hereinbefore in regard to nut member 64 in FIG. 6. Between the nut member 88 and the member 81 there is arranged a ring 89 made of metal, which can be hardened to better withstand the clamping force. It can be seen that the opening in ring 89 is dimensioned so that the threaded end portion can pass freely therethrough while one face surface of the ring seats against a flat load transfer face 90 which terminates at the cup-shaped surface 91 forming a relief area 92. Between the head portion 84 and member 80, there is arranged a compression ring 93 which can be hardened to better withstand the forces. It is to be understood, however, that ring 89 and/or ring 93 can also be made of relatively soft metal or other materials so that the material of the ring will upset under an applied force which is generated by a plurality of jack bolts 94. By controlling the hardness of ring 93, it is possible to avoid upsetting end face 95 of the jack bolts 94. Each jack bolt includes a threaded shank portion 96 comprised of threads 97 having a uniform pitch slightly greater than the pitch of internal threads 98 formed in the head portion 84. Each jack bolt includes a head portion 99 which can be engaged with a suitable wrench or other device for applying torque to the jack bolt. The jack bolt may be embodied as socket head cap screws. The length of the threaded portion of the jack bolts is sufficient to extend through a threaded hole in the head portion 84 and present face 95 for compressive engagement with the opposed face surface of ring 93. The head portion 84 further includes a relief area 101 comprising a large radius which is formed as an undercut to avoid stress concentration at the point where the head portion 84 projects radially from the shank portion 83. The stresses on the head portion which must be transferred to the shank portion are introduced as the jack bolts are torqued as explained previously. There may be a differential between the pitch of the internal threads and the pitch of the threads on the jack bolts so that as the jack bolts are torqued to greater extents, the forces are generated by uniform loading of the threads. The forces generated by the jack bolts can be so great such that the shank portion 83 will undergo elastic stretching. The forces are transferred to the nut member by the mating threads 86 and 87. In the same manner as explained previously, tooth flanks of the mating threads can move in a progressive manner into contact as stresses are applied to the threaded connection so that the consecutive convolutions of the mating threads along the entire length thereof become uniformly loaded. As this occurs, the reduced diameter portion 104 of the nut member 98 can deflect inwardly while the enlarged portion 105 deflects outwardly. This deflection of portions of the nut member contributes to a high loading potential of the threaded connection. This is particularly important in ultra-high strength bolts in which it is difficult to generate a sufficient thread differential by modifying only the pitch of the thread.

While the present invention has been described in connection with the preferred embodiment it is understood that other similar embodiments may be used or modifications and additions may be made to the described embodiment for performing the same function of the present invention without deviating therefrom. Therefore, the present invention should not be limited to any single embodiment but rather construed in breadth and scope in accordance with the recitation of the appended claims.

I claim as my invention:
1. A threaded fastener apparatus including the combination of:
   an internally threaded first member including internal threads having a first uniform pitch along a predetermined length thereof; and
   an externally threaded second member including external threads along a predetermined length thereof for mating engagement with a predetermined length of threads of the first member, said external threads having a second uniform pitch which is effectively different from said first uniform pitch by an amount such that the length of interfitting internal and external threads starts at a point of mating engagement where contact between an external thread flank and an internal thread flank exists and proceeding therefrom the corresponding successively occurring opposed thread flanks are spaced apart by a progressively increasing amount of clearance without interference between the interfitting threads for establishment of force transmitting contact between the spaced apart thread flanks by elastic deformation of at least one of said first and second members, said elastic deformation occurring in response to a force applied in a direction to decrease said progressively increasing amount of clearance, said internally threaded first member having outer and inner portions, said inner portion having a part associated therewith, said part having a relief area extending from a load transfer face to permit inward elastic deformation of a portion of the threads within said inner portion, said load transfer face forming a fulcrum radially spaced from said external thread of said second member and separated by said relief area.

2. The fastener apparatus according to claim 1, wherein said part is formed as an integral portion of said internally threaded first member.

3. A fastener apparatus to threadedly engage a portion of external threads on a shaft, said apparatus including a nut member having internal threads for mating engagement with said external threads of said shaft, said nut member including an inner portion and an outer portion with respect to its operative position on said shaft, said outer portion having a reduced transverse size compared to the transverse size of said inner portion and being separated from said inner portion by a transition portion, said inner portion having a relief area extending from a load transfer face to permit inward elastic deformation of a portion of the threads within said outer portion, said load transfer face forming a fulcrum radially spaced from the external threads of the shaft members and separated by said relief area.

4. A fastener apparatus to compress a support member against a first member, said apparatus including an elongated shank part extending from said first member, a nut member including internal threads having a first uniform pitch along a predetermined length thereof, one end portion of said elongated shank part including external threads along a predetermined length thereof for mating engagement with a predetermined length of threads of internal threads, said external threads having a second uniform pitch which is effectively different from said first uniform pitch by an amount such that the length of interfitting internal and external threads start at a point of mating engagement where contact between an external thread flank and an internal thread flank exists and proceeding therefrom the corresponding successively occurring opposed thread flanks are spaced apart by a progressively increasing amount of clearance without interference between the interfitting threads for establishment of force transmitting contact between the spaced apart thread flanks by elastic deformation of at least one of said shank portions, said elastic deformation occurring in response to a force applied in a direction to decrease said progressively increasing amounts of clearance, said nut member including an inner portion and an outer portion, said inner portion having a relief area extending from a load transfer face to permit inward elastic deformation of a portion of the threads within said outer portion, said load transfer face forming a fulcrum radially spaced from the external threads of said shank part and separated by the relief area, a stress generating flange connected to an opposite end portion of said elongated shank part for exerting a compressive force on said support member, said stress generating flange having a plurality of holes at spaceda-part locations about an outer peripheral part thereof to overlie said support member, and a plurality of jack bolts threadedly engaged with said holes to separately receive a torque, the jack bolts having end parts extending from said holes to stress said elongated shank part extending between said nut member and said stress generating flange through torquing force between said support member and said first member.

5. A fastener apparatus to threadedly engage a portion of external threads having a uniform pitch on a shaft, said apparatus including a nut member having internal threads for mating engagement with a predetermined length of said external threads of said shaft, said internal threads having a uniform pitch which exceeds that of said external threads by an amount such that the length of interfitting internal and external threads starts at a point of mating engagement where contact between an external thread flank and an internal thread flank exists and proceeding therefrom the corresponding successively occurring opposed thread flanks are spaced apart by a progressively increasing amount of clearance without interference between the interfitting threads for establishment of force transmitting contact between the spaced apart thread flanks by elastic deformation of said nut member, said elastic deformation occurring in response to a force applied in a direction to decrease said progressively increasing amounts of clearance, said nut member includes an inner portion and an outer portion, said inner portion having a relief area extending from a load transfer face to permit inward elastic deformation of a portion of the threads within said outer portion, said load transfer face forming a fulcrum radially spaced from the external threads of said shaft and separated by the relief area.

6. A fastener apparatus to compress a support member against a first member, said apparatus including an elongated shank part extending from said first member, an anchor flange connected to one end portion of said elongated shank part for support by said first member, a stress generating flange connected to an opposite end portion of said elongated shank part for exerting a compressive force on saaid support member, said stress generating flange having a plurality of holes at spaceda-part locations about an outer peripheral part thereof to overlie said support member, and a plurality of jack bolts threadedly engaged with said holes to separately receive a torque, the jack bolts having end parts extending from said holes to stress said elongated shank part extending between said anchor flange and said stress generating flange through torquing said jack bolts for applying a compressive reaction force between said support member and said first member, said stress generating flange including internal threads in said holes having a first uniform pitch along a predetermined length thereof, said jack bolts having external threads along a predetermined length thereof for mating engagement with a predetermined length of threads of internal threads, said external threads having a second uniform pitch which is effectively different from said first uniform pitch by an amount such that the length of interfitting internal and external threads starts at a point of mating engagement where contact between an external thread flank and an internal thread flank exists and proceeding therefrom the corresponding suocessively ooourring opposed thread flanks are spaced apart by progressively increasing amount of clearance without interference between the interfitting threads for establishment of the force transmitting contact between the spaced apart thread flanks by elastic deformation of at least one of said stress generating flange and said jack bolts, said elastic deformation occurring in response to a force applied in a direction to decrease said progressively increasing amounts of clearance, said stress generating flange having an undercut relief area at the function between said shank part and said stress generating flange to avoid stress concentration thereat when torquing jack bolts.

7. A fastener apparatus according to claim 6 wherein said anchor flange and said shank part are threadedly connected, said flange having an outer and inner portions, said inner portion having a relief area extending from a load transfer face to permit inward elastic deformation of a portion of the threads within said outer portion, said load transfer face forming a fulcrum radially spaced from the external threads of the shank parts and separated by said relief area.

8. The fastener apparatus according to claim 1 wherein said first and second uniform pitches are formed by threading said first and second members.

9. The fastener apparatus according to claim 1 wherein the threaded pitch difference is reduced by forces producing a bending moment in said first member which causes one portion of the threads to contract against threads of the second member and a second portion of threads to expand away from threads of the second member.

10. The threaded fastener apparatus according to claim 1 wherein said load transfer face includes a flat load transfer surface spaced outward from said internal threads to impose a bending moment in the first member to permit inward elastic deformation of the top portion and outward elastic deformation of the bottom portion.

11. The threaded fastener apparatus according to claim 1 wherein said load transfer face includes a flat-load transfer surface extending to said relief area, said relief area extending to said threads comprising said first uniform pitch thus creating a bending moment under load forcing radial contraction of the top portion and radial expansion of said bottom portion.

12. The threaded fastener apparatus according to claim 6 wherein said first and second uniform pitches are formed by threading said first and support members.

13. The threaded fastener apparatus according to claim 5 wherein said first and second uniform pitches are formed by threading said first and second members.

14. The fastener apparatus according to claim 5 wherein the threaded pitch difference is reduced by forces producing a bending moment in said first member which causes one portion of the threads to contract against threads of the second member and a second portion of threads to expand away from threads of the second member.

15. The threaded fastener apparatus according to claim 14 wherein said load transfer face includes a flat load transfer surface spaced outward from said internal threads of said nut to impose a bending moment thereon to permit inward elastic deformation of said top portion and outward elastic deformation of said bottom portion.

16. The threaded fastener apparatus according to claim 14 wherein said load transfer face includes a flat-load transfer surface extending to a relief area, said relief area extending to said threads comprising said first uniform pitch thus creating a bending moment under load for forcing radial contraction of said top portion and radial expansion of said bottom portion.

17. The fastener apparatus according to claim 6 wherein said external and internal threads are formed by threading said shaft and said nut member.

18. The fastener apparatus according to claim 6 wherein the effective difference between the pitch of the external threads and the pitch of the internal threads are created by forces producing a bending moment in said nut member which causes one portion of the threads thereof to contract against said external threads and a second portion of threads in said nut member to expand away from said external threads.

19. The threaded fastener apparatus according to claim 6 wherein said bottom portion includes a flat load transfer surface spaced outward from said internal threads to impose a bending moment in the nut member to permit inward elastic deformation of the top portion and outward elastic deformation of the bottom portion.

20. The threaded fastener apparatus according to claim 6 wherein said bottom portion includes a flat-load transfer surface extending to a relief area, said relief area extending to said internal threads to comprise said first uniform pitch thus creating a bending moment under load forcing radial contraction of the top portion and radial expansion of said bottom portion.

* * * * *